United States Patent
Niemelä

(10) Patent No.: US 9,910,987 B2
(45) Date of Patent: Mar. 6, 2018

(54) MALWARE DETECTION METHOD AND APPARATUS

(75) Inventor: Jarno Niemelä, Espoo (FI)

(73) Assignee: F-Secure Corporation, Helsinki (FI)

( * ) Notice: Subject to any disclaimer, the term of this patent is extended or adjusted under 35 U.S.C. 154(b) by 951 days.

(21) Appl. No.: 12/998,038

(22) PCT Filed: Sep. 7, 2009

(86) PCT No.: PCT/EP2009/061537
§ 371 (c)(1),
(2), (4) Date: Mar. 11, 2011

(87) PCT Pub. No.: WO2010/029036
PCT Pub. Date: Mar. 18, 2010

(65) Prior Publication Data
US 2011/0167275 A1   Jul. 7, 2011

(30) Foreign Application Priority Data
Sep. 11, 2008   (GB) .................................. 0816572.2

(51) Int. Cl.
*H04L 9/00* (2006.01)
*G06F 21/56* (2013.01)

(52) U.S. Cl.
CPC .......... *G06F 21/565* (2013.01); *G06F 21/562* (2013.01)

(58) Field of Classification Search
CPC .................................................... H04L 9/3247
USPC ...................... 713/156, 188, 100; 726/14, 26
See application file for complete search history.

(56) References Cited

U.S. PATENT DOCUMENTS

| | | | |
|---|---|---|---|
| 6,094,731 A | 7/2000 | Waldin et al. | 714/38 |
| 6,215,875 B1 | 4/2001 | Van Oorschot | 380/30 |
| 6,223,284 B1 * | 4/2001 | Novoa et al. | 713/100 |
| 6,304,974 B1 | 10/2001 | Samar | 713/201 |
| 6,611,925 B1 | 8/2003 | Spear | 714/38 |
| 6,928,550 B1 | 8/2005 | Le Pennec et al. | |
| 7,107,618 B1 * | 9/2006 | Gordon et al. | 726/24 |
| 7,706,567 B2 * | 4/2010 | McComb | G06K 9/036 358/402 |

(Continued)

FOREIGN PATENT DOCUMENTS

| | | |
|---|---|---|
| EP | 1 117 207 A2 | 7/2001 |
| EP | 1 523 126 A1 | 4/2005 |

(Continued)

OTHER PUBLICATIONS

"Portable Document Format Security Analysis and Malware Threats"—Blonce et al, Army Signals Academy—Virology and Cryptology Laboratory, Jun. 2008 http://www.blackhat.com/presentations/bh-europe-08/Filiol/Presentation/bh-eu-08-filiol.pdf.*

*Primary Examiner* — Randy Scott
(74) *Attorney, Agent, or Firm* — Harrington & Smith

(57) ABSTRACT

According to a first aspect of the present invention there is provided a malware detection method implemented within a computer. The method includes, for a given electronic file, determining if the file is associated with a valid digital signature. If the file is associated with a valid digital signature, then verifying that the signature belongs to a trusted source. If the signature does belong to a trusted source then not performing a malware scan of said file, and if the signature cannot be verified as belonging to a trusted source then performing said scan.

10 Claims, 2 Drawing Sheets

(56) References Cited

U.S. PATENT DOCUMENTS

| | | | |
|---|---|---|---|
| 8,452,981 B1* | 5/2013 | Kiel | G06F 21/52 713/189 |
| 8,656,489 B1* | 2/2014 | Glick | G06F 21/562 707/692 |
| 2002/0078347 A1 | 6/2002 | Hericourt et al. | 713/156 |
| 2002/0144121 A1* | 10/2002 | Ellison | G06F 21/55 713/176 |
| 2003/0084298 A1* | 5/2003 | Messerges et al. | 713/176 |
| 2005/0120203 A1* | 6/2005 | Yeh et al. | 713/156 |
| 2006/0184792 A1* | 8/2006 | Berlin | 713/165 |
| 2006/0218637 A1 | 9/2006 | Thomas et al. | 723/23 |
| 2007/0098175 A1 | 5/2007 | Jakubiec | 380/277 |
| 2007/0180528 A1* | 8/2007 | Kane | 726/24 |
| 2007/0266421 A1* | 11/2007 | Vaidya et al. | 726/1 |

FOREIGN PATENT DOCUMENTS

| | | |
|---|---|---|
| GB | 2 400 932 A | 10/2004 |
| WO | WO 00/28420 | 5/2000 |
| WO | WO 02/33525 A2 | 4/2002 |
| WO | WO 2004/021638 | 3/2004 |
| WO | WO 2008/068111 A1 | 6/2008 |

* cited by examiner

MALWARE DETECTION METHOD AND APPARATUS

TECHNICAL FIELD

The present invention relates to a malware detection method.

BACKGROUND

Malware is short for malicious software and is used as a term to refer to any software designed to infiltrate or damage a computer system without the owner's informed consent. Malware can include viruses, worms, trojan horses, rootkits, adware, spyware and any other malicious and unwanted software. Any computer device, such as a desktop personal computer (PC), laptop, personal data assistant (PDA) or mobile phone, can be at risk from malware.

When a device is infected by malware the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware.

Detecting malware is challenging as the malware authors design their software to be difficult to detect, often employing technology that deliberately hides the presence of malware on a system, i.e. the malware application may not show up on the operating system tables that list currently running processes.

Computer devices make use of anti-virus software to detect and possibly remove malware. This anti-virus software can make use of various methods to detect malware including scanning, integrity checking and heuristic analysis. Of these methods, malware scanning involves the anti-virus software examining files for a virus fingerprint or "signature" that is characteristic of an individual malware program. Typically, this requires that the anti-virus software has a database containing the signatures. When the provider of the anti-virus software identifies a new malware threat, the threat is analysed and its signature is extracted. The malware is then "known" and its signature can be supplied as updates to the anti-virus software database. However, scanning files for malware can consume significant processing resources potentially resulting in a reduction in the performance of a computing device.

In order to reduce this processing burden, some anti-virus solutions provide for lists of trusted files that are highly unlikely to be a source of malware. These trusted files are those files published or authored by trusted sources. For example, those files that make up a piece of software distributed by a reputable software provider could be considered to be trustworthy such that, provided such files have not been modified since their publication/release, these files need not be scanned for malware.

The provider of the anti-virus software identifies files that can be considered trustworthy and applies a one-way hash function to the file to convert it to a fixed-length string known as a hash value (also known as a digest). For a description of one-way hash functions see Chapter 2 of Applied Cryptography by Bruce Schneier, 1997. The hash value provides a fingerprint of the file that is highly unlikely to be duplicated by another input. Given the extremely small probability of such a 'collision' and the one-way nature of a hash function, it is extremely difficult or almost impossible to calculate the input that has produced a given hash value, even though the hash function used to generate the hash value is publicly available. The list of the hash values of these trusted files is secured against unauthorised modification (i.e. by digitally signing the trusted file list) and provided to a user's device.

Prior to scanning a given file to determine if the file could possibly be or contain malware (for example when prompted by the user, when due to perform a scheduled scan, or when initiated in response to a request to run the file or in response to the receipt of the file), the anti-virus software will determine if the file is on the trusted file list. The anti-virus software applies the same one-way hash function to the file to be checked and then compares the resulting hash value with the trusted file list provided by the supplier of the anti-virus software. If a match is found in the list, there is an extremely high probability that this file can be trusted, i.e. it is from a trusted source and has not been modified since its first publication, and therefore it need not be scanned for malware.

As with a database of virus signatures, in order for a trusted file list to be widely effective for use, it must include the hash value of as many trusted files as possible. The anti-virus supplier does not necessarily know what files are in use, or are likely to be used, in each user device. Given that there are thousands of files that are published by a variety of trusted sources, these trusted file lists are large and can consume a significant amount of memory. This is a particular problem for devices such as mobile phones and PDA's that are likely to be provided with less memory than a traditional PC. Moreover, the list must also be continually updated by the provider of the anti-virus software, requiring that it must expend significant effort to both maintain and expand the list.

SUMMARY

According to a first aspect of the present invention there is provided a malware detection method implemented within a computer. The method comprises, for a given electronic file, determining if the file is associated with a valid digital signature. If the file is associated with a valid digital signature, then verifying that the signature belongs to a trusted source. If the signature does belong to a trusted source then not performing a malware scan of said file, and if the signature cannot be verified as belonging to a trusted source then performing said scan.

Embodiments of the present invention provide that trusted files can be identified dynamically within an individual device, removing the burden placed on the anti-virus provider to maintain and update a trusted file list. Furthermore, dynamically identifying trusted files within a device would, in most cases, ensure that a larger proportion of the trustworthy files present on a device are identified. This further reduces the processing burden by minimising the number of files that require a full malware scan.

Preferably, if the file is associated with a valid digital signature and the signature belongs to a trusted source, generating a hash value of the file path and adding the file path hash value to a database of trusted files. Then on subsequent occasions and prior to determining if the file is associated with a valid digital signature, the method may further comprise, generating a hash value of the file path and determining if the hash value of the file path is contained in the database of trusted files. If the hash value of the file path is contained in the database of trusted files then not performing a malware scan of said file, and if the hash value of the file path is not contained in database of trusted files, then proceeding to determine if the file is associated with a valid digital signature and verify that the signature belongs to a trusted source.

The step of determining if the file is associated with a valid digital signature may comprise determining if the file has a valid embedded or attached signature. Then, if the file does not have a valid embedded or attached signature, generating a hash value of the file and determining if the hash value is listed in a catalog having a valid embedded or attached digital signature. The digital signature may rely upon a public key infrastructure.

The step of verifying that the signature belongs to a trusted source may comprise maintaining a database of trusted public keys, identifying a public key used to verify the digital signature, and determining if the public key is contained in the database of trusted public keys. Preferably, the step of maintaining the database of trusted public keys comprises periodically receiving new trusted public keys and adding these to the database.

In a further embodiment, the step of determining if the file is associated with a valid digital signature comprises using an Application Programming Interface of an operating system of the computer. Preferably, the operating system is a Windows™ based operating system and said Application Programming Interface is the WinVerifyTrustEx Application Programming Interface.

According to a second aspect of the present invention there is provided a recording medium storing computer interpretable instructions for causing a programmable computer to perform a malware scanning method, the method being according to the first aspect described above.

According to a third aspect of the present invention there is provided a computer. The computer comprises a memory storing a database of trusted public keys, and a processor for determining if a given electronic file is associated with a valid digital signature and, if it is, then verifying that the signature belongs to a trusted source, and if the signature is verified then not performing a malware scan of said file, and if the signature cannot be verified as belonging to a trusted source then performing said scan.

According to a fourth aspect of the present invention there is provided a method of maintaining a database of trusted public keys in a plurality of computer devices for the purpose of eliminating the need to scan trusted files for malware at the computer devices. The method comprises identifying at a network-based service, public keys belonging to a public key infrastructure architecture and which are used to digitally sign electronic files, verifying that these public keys belong to a trusted source, and securely sending the trusted public keys to the devices.

DETAILED DESCRIPTION

Figure 1:
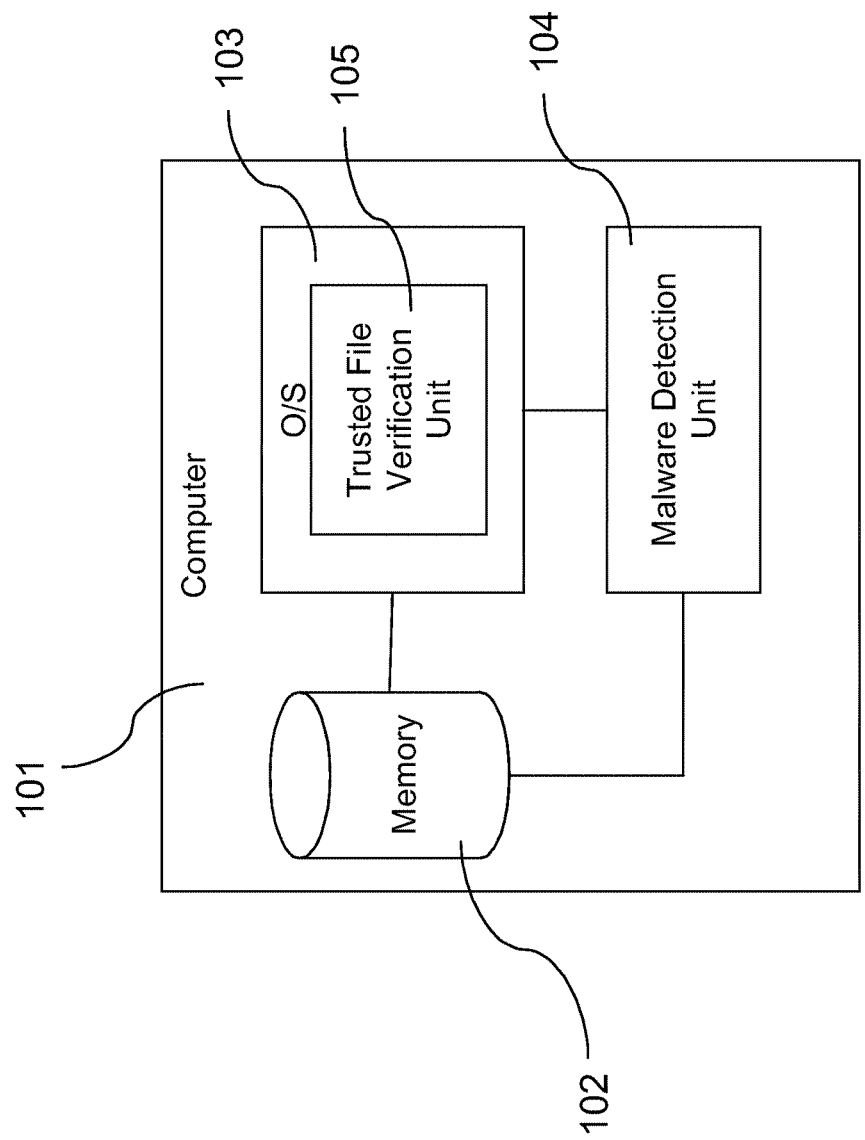
FIG. 1 illustrates schematically a computer suitable for detecting malware according to an embodiment of the present invention.

As has already been described, being able to identify files that have been supplied, published or authored by a source that can be considered trustworthy reduces the processing burden when anti-virus software performs malware scanning However, this places a further burden on the provider of the anti-virus applications, as these lists must be kept up-to-date and must identify as many trusted files as possible in order to be effective. Furthermore, given that there are a very large number of files that could be considered trustworthy, these lists are large such that they can consume a significant amount of memory within a device and, in providing regular updates to the list via a network or Internet connection, can cause an increase in data traffic (which may result in additional costs to an end user, e.g. where the network connection is via a mobile telephone network).

It has been recognised here that a large proportion of those files that can be considered trustworthy are associated with a digital signature of a trusted software provider. This is the case, for example, with certain Microsoft™ originating files. The Windows™ operating system makes use of an embedded Trust Verification API to confirm the source and integrity of files using the associated digital signature. To be associated with a digital signature, a file can either have its own embedded/attached digital signature or the file can be listed in a catalog file that has itself been signed. Catalog files contain a "fingerprint" for each of a set of files. If the fingerprint for a file can be found in a catalog file, and the catalog file has been signed by a trusted source, then that file could itself be considered trustworthy.

Digital signatures are used to identify and verify the sender, author or publisher of a file. There are two steps involved in creating a digital signature for the associated file (source file or catalog file). The first step involves creating a hash value from the file. This hash value is then signed, using the signer's private key. To verify a signature, a hash value must be created from the file in the same way the signature was created, using the same hash function. This hash value is then verified against the signature using the public key of the signer. For a description of digital signatures and public key cryptography see Chapter 2 of Applied Cryptography by Bruce Schneier, 1997.

Of course, the steps described in the preceding paragraph merely confirm that the file is "owned" by the party that possesses the private key corresponding to the used public key. In order to confirm the identity of the owner, and therefore the sender, publisher or author of a signed file, the recipient of a file can make use of a digital certificate. The digital certificate comprises a public key, details of the function/algorithm used to generate the hash value, and any important information regarding the identity of the owner of the public key, and a signature generated by a certification authority. The certification authority is a trusted organisation that issues a digital certificate when it has verified the identity of the owner of a public key.

Examples of such certificate authorities are Verisign™, DigiCert™ and Thawte™. The certificate is often embedded within a signed document or, alternatively, the certificate may be contained in a manifest file supplied with the application or with new software updates.

There will now be described a method of dynamically identifying trusted files that need not be otherwise scanned for malware. The method involves making use of the presence of the digital signatures of a software supplier to confirm, within a device, that a file is from a trustworthy source and that the file has not been tampered with.

FIG. 1 illustrates schematically a user device 101 according to an embodiment of the present invention and which comprises a memory 102, an operating system 103 and a malware detection unit 104. The memory 102 stores a database of public keys. The public keys in the database are those that have been identified as belonging to a trusted source. As such, if a public key is not found within the database then it is assumed not to belong to a trusted source. The database of public keys will usually be supplied and updated by the provider of the malware detection unit 104. The memory 102 also stores a database of trusted files. This database contains an identifier for those files that have previously been identified as being from a trusted source. The memory 102 also stores any catalog files. The operating system 103, such as Microsoft™ Windows™, provides a trust verification function unit 105.

Prior to scanning a file for malware, the malware detection unit 104 determines whether or not the file is associated with a valid digital signature using the trust verification functions of the operating system 103. If the file is associated with a valid digital signature then the malware detection unit 104 checks the database of trusted keys, stored in the memory 102, to determine whether or not the database contains the public key used to decrypt the digital signature. If the database does contain the public key, then the file is considered to be from a trusted source and the malware detection unit 103 excludes the file from the malware scan. Furthermore, an identifier for the now trusted file is added to a database of trusted file identifiers stored in the memory 102. On subsequent occasions this database can be checked to determine if a file has previously been identified as from a trusted source. This can be achieved by applying a one-way hash function to the information relating to the location of the file (i.e. the file path) and adding the resulting hash value to the database of trusted files. On subsequent occasions, the same hash function will be applied to the file path and the resulting hash value compared with the database of trusted files. If the hash value matches a value in the database then the file does not need to be scanned.

Figure 2:
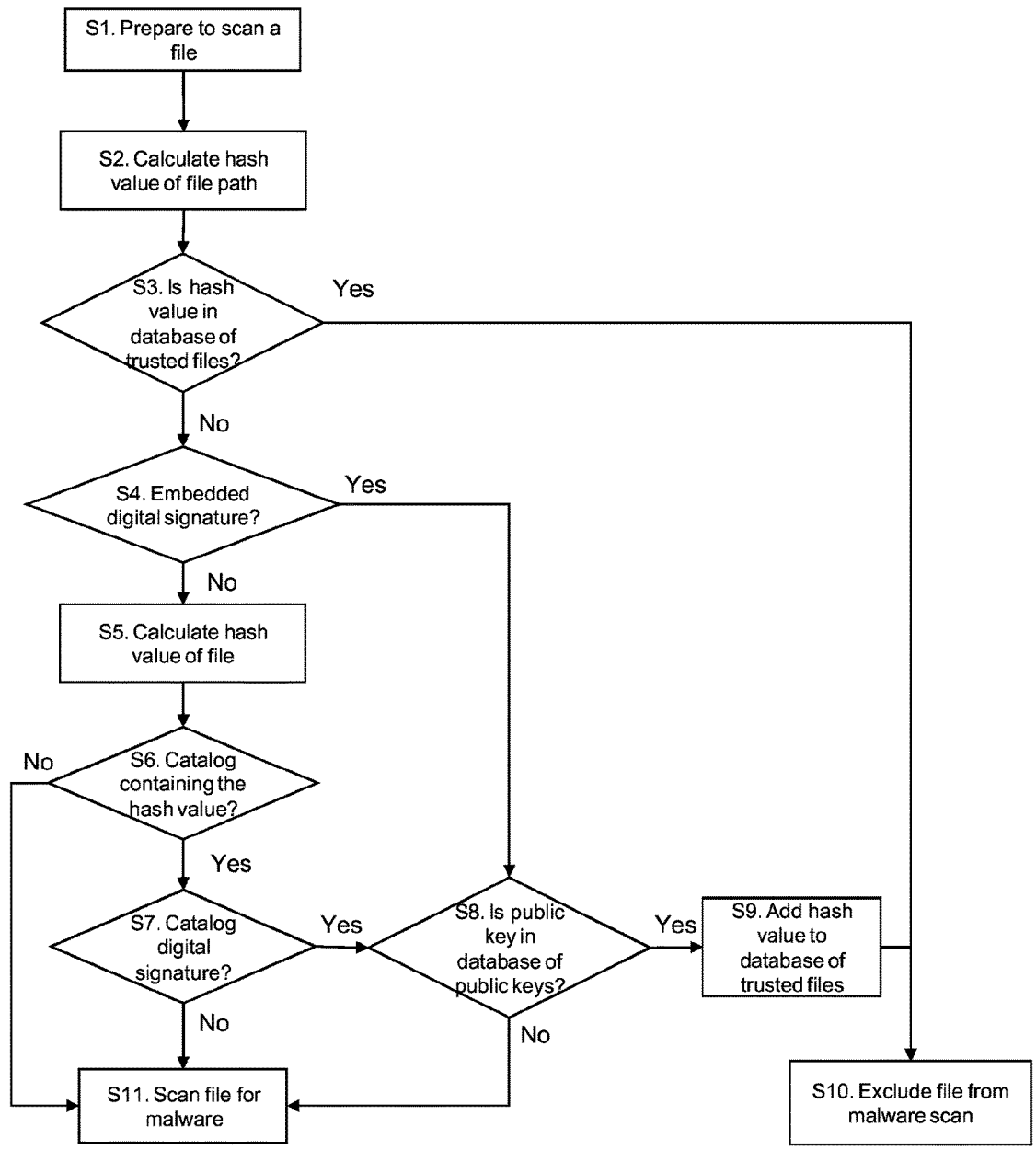
FIG. 2 is a flow diagram illustrating the process of determining which files can be excluded from a malware scan according to an embodiment of the present invention.

FIG. 2 is a flow diagram further illustrating the process of dynamically identifying trusted files within a user device 101 according to an embodiment of the present invention. The steps performed are as follows:

S1. The malware detection unit 104 prepares to scan a file on the device 101. For example, the scan can be a scheduled scan, a scan prompted by the user, or a scan initiated in response to a request to run the file or in response to the receipt of the file S2. The malware detection unit 104 calculates a cryptographic hash of the file path.

S3. The malware detection unit 104 then checks the database of trusted files stored in the memory 102 to see if the hash value for the file path is present. If the hash value is stored in the database then the process proceeds to step S10.

S4. If the hash value for the file path is not found in the database then the malware detection unit 104 makes a call to the trust verification function unit 105 of the operating system 103, using the WinVerifyTrustEx function to verify that the file has a valid embedded/attached digital signature. If the file is found to have a valid embedded/attached digital signature then the process proceeds to step S8.

S5. If the file is found not to have an embedded/attached digital signature then the malware detection unit 104 makes another call to the trust verification function unit 105 of the operating system 103, using the CryptCATAdminCalcHashFromFileHandle function to calculate a cryptographic hash of the file.

S6. The malware detection unit 104 then makes a further call to the trust verification function unit 105 of the operating system 103, using the CryptCATAdminEnumCatalog-FromHash function, to check the catalog files stored in the memory 102 to see if they contain the hash value of the file. If the hash value of the file is not found within one of the catalog files then the process proceeds to step S11.

S7. If the hash value for the file is found within one of the catalogs then the malware detection unit 104 makes use of the CryptCATCatalogInfo-FromContext function of the trust verification function unit 105 to retrieve the catalog information and uses the WinVerifyTrustEx function to verify that the digital signature of the catalog is valid. If the catalog does not have a valid signature then the process proceeds to step S11.

S8. If a file has been identified as being associated with a valid digital signature, either by way of an embedded/attached digital signature or by having the files hash value listed in a catalog file that itself has a valid digital signature, then the malware detection unit 104 retrieves the public key from the associated digital certificate. As previously described, the digital certificate is often embedded within a signed file such that the certificate, and therefore the public key, can be extracted from the file itself. Alternatively, the digital certificate may be found in an associated manifest file. The malware detection unit 104 checks the public key against the database of public keys stored in the memory 102. If the public key is not found within the database then it does not belong to a trusted source and the process proceeds to step S11.

S9. If the public key used to decrypt the signature matches one of the public keys in the database, then the hash value of the file path (calculated in step S2) is added to the database of trusted files stored in the memory 102. On subsequent occasions the hash value of this file path will then be found during step S3, when the database of trusted files is checked. The process proceeds to step S10

S10. If any of the previous steps have determined that the file is from a trusted source then the file is excluded from the malware scan.

S11. If the file, or a catalog listing the file, does not have a valid digital signature, or the public key used for the signature is not that of a trusted source, then the file will be scanned for malware using for example conventional scanning techniques based on malware signatures and heuristics.

The embodiment described above makes use of, i.e. "piggybacks" on, a trust verification function unit within the operating system, such as the Trust Verification API provided by the Microsoft™ Windows™. However, this is a non-limiting example and the trust verification function unit, or equivalent functionality, may equally be provided in an alternative operating systems or its installation packages, or in the malware detection unit.

The use of a trusted file database (see steps S2, S3 and S9) is optional. However, use of such a database may improve the performance of the process by eliminating the need for checking the file or an associated catalog file for a valid and trusted digital signature.

The database of trusted public keys could be provided and/or updated by uploads from a web server accessed over the Internet and operated by the provider of the malware detection software, or directly from the certification authorities. Updates may be received by any transmission method but may also be provided in the form of a memory card or other storage device that can be accessed by a reader that is part of, or is connected to the device. The database of trusted public keys would itself need to be secured against modification, such that its source and integrity could be verified. For example, the database of public keys and any updates to this database could be signed by the provider of the anti-virus software. This signature could then be verified by means of a digital certificate. Alternatively, the user of a device or the administrator of a network could choose to trust a particular sender, publisher or author and add their public key to the database when prompted or when a valid digital certificate, signed by a trusted certificate authority, is received or loaded into the device.

The method described provides that trusted files can be identified dynamically within an individual device, removing the burden placed on the anti-virus provider to maintain and update a trusted file list. The anti-virus provider will then only be required to supply and maintain a database of public keys belonging to trusted sources. This database of public keys consumes significantly less memory than a list of trusted files and requires significantly less effort to build and maintain. The method also provides that the device does not need to store a list containing a large number of hash values for trusted files that are not actually on the device, reducing the memory consumed by such a list and reducing the data traffic that would otherwise be required if the anti-virus software provider were to provide regular updates to the list via a network or internet connection. Furthermore, dynamically identifying trusted files within a device would, in most cases, ensure that a larger proportion of the trustworthy files present on a device are identified. This further reduces the processing burden by minimising the number of files that require a full malware scan.

It will be appreciated by the person of skill in the art that various modifications may be made to the above described embodiments without departing from the scope of the present invention.

The invention claimed is:

1. A malware detection method implemented within a computer comprising a processor and comprising:
   receiving an electronic file, determining by the computer if the electronic file is associated with a valid digital signature using a trust verification system of an operating system of the computer; and if the electronic file is associated with the valid digital signature, then verifying by the computer that the signature belongs to a trusted source, wherein the trusted source authored or published the file and created the signature, and if so then not performing a malware scan of said electronic file, and if the signature cannot be verified as belonging to a trusted source then performing said scan by the computer, wherein the electronic file is associated with the valid digital signature only if the electronic file has a valid embedded or attached digital signature, or the electronic file is listed in a catalog having a valid embedded or attached digital signature, wherein if the electronic file is verified as being associated with the valid digital signature the trust verification system of an operating system of the computer is used to verify that the signature belongs to the trusted source, and if the electronic file is not verified as belonging to a trusted source then performing said scan by the computer;
   if the electronic file is associated with the valid digital signature and the signature belongs to a trusted source, generating a file path hash value and adding the file path hash value to a database of trusted files; and
   on subsequent occasions and prior to determining if the file is associated with the valid digital signature, generating a hash value of the file path and determining if the hash value of the file path is contained in the database of trusted files, wherein:
      if the hash value of the file path is contained in the database of trusted files then not performing a malware scan of said file, and
      if the hash value of the file path is not contained in database of trusted files, then proceeding to determine if the file is associated with the valid digital signature and verify that the signature belongs to a trusted source.

2. The method according to claim 1, wherein the step of determining if the file is associated with the valid digital signature comprises: determining if the file has a valid embedded or attached signature.

3. The method according to claim 2 and comprising, if the file does not have a valid embedded or attached signature then: generating a hash value of the file; and determining if the hash value is listed in a catalog having a valid embedded or attached digital signature.

4. The method according to claim 1, wherein said digital signature relies upon a public key infrastructure.

5. The method according to claim 4, wherein the step of verifying that the signature belongs to a trusted source comprises: maintaining a database of trusted public keys; identifying a public key used to verify the digital signature; and determining if the public key is contained in the database of trusted public keys.

6. The method according to claim 5, wherein step of maintaining the database of trusted public keys comprises: periodically receiving new trusted public keys and adding these to the database.

7. The method according to claim 1, wherein said step of determining if the file is associated with the valid digital signature comprises using an Application Programming Interface of an operating system of the computer.

8. The method according to claim 7, wherein said operating system is a Windows™ based operating system and said Application Programming Interface is the WinVerifyTrustEx Application Programming Interface.

9. A non-transitory recording medium storing computer interpretable instructions for causing a programmable computer to perform a malware detection method implemented within the computer and comprising:
   receiving an electronic file, determining by the computer if the electronic file is associated with a valid digital signature using a trust verification system of an operating system of the computer; and if the electronic file is associated with the valid digital signature, then verifying by the computer that the signature belongs to a trusted source, wherein the trusted source authored or published the file and created the signature, and if so then not performing a malware scan of said electronic file, and if the signature cannot be verified as belonging to a trusted source then performing said scan by the computer, wherein the electronic file is associated with the valid digital signature only if the electronic file has a valid embedded or attached digital signature, or the electronic file is listed in a catalog having a valid embedded or attached digital signature, wherein if the electronic file is verified as being associated with the valid digital signature the trust verification system of an operating system of the computer is used to verify that the signature belongs to the trusted source, and if the electronic file is not verified as belonging to a trusted source then performing said scan by the computer;

if the electronic file is associated with the valid digital signature and the signature belongs to a trusted source, generating a file path hash value and adding the file path hash value to a database of trusted files; and on subsequent occasions and prior to determining if the file is associated with the valid digital signature, generating a hash value of the file path and determining if the hash value of the file path is contained in the database of trusted files; wherein:

if the hash value of the file path is contained in the database of trusted files then not performing a malware scan of said file, and if the hash value of the file path is not contained in database of trusted files, then proceeding to determine if the file is associated with the valid digital signature and verify that the signature belongs to a trusted source.

10. A computer comprising: a memory storing a database of trusted public keys; and a physical processor for determining if a given electronic file is associated with a valid digital signature using a trust verification system of an operating system of the computer, and, if the electronic file is associated with the valid digital signature, then verifying that the signature belongs to a trusted source, wherein the trusted source authored or published the file and created the signature, and if the signature is verified then not performing a malware scan of said file, and if the signature cannot be verified as belonging to a trusted source then performing said scan, wherein the electronic file is associated with the valid digital signature only if the electronic file has a valid embedded or attached digital signature, or the electronic file is listed in a catalog having a valid embedded or attached digital signature, wherein if the electronic file is verified as being associated with the valid digital signature the trust verification system of an operating system of the computer is used to verify that the signature belongs to the trusted source, and if the electronic file is not verified as belonging to a trusted source then performing said scan by the computer;

if the electronic file is associated with the valid digital signature and the signature belongs to a trusted source, generating a file path hash value and adding the file path hash value to a database of trusted files;

on subsequent occasions and prior to determining if the file is associated with the valid digital signature, generating a hash value of the file path and determining if the hash value of the file path is contained in the database of trusted files, wherein:

if the hash value of the file path is contained in the database of trusted files then not performing a malware scan of said file, and if the hash value of the file path is not contained in database of trusted files, then proceeding to determine if the file is associated with the valid digital signature and verify that the signature belongs to a trusted source.

* * * * *